US010117232B2

(12) United States Patent
Lunttila et al.

(10) Patent No.: US 10,117,232 B2
(45) Date of Patent: Oct. 30, 2018

(54) METHOD AND APPARATUS FOR SIGNALING REFERENCE SIGNALS TO A UE IN AN LTE SYSTEM

(75) Inventors: Timo Erkki Lunttila, Espoo (FI); Esa Tapani Tiirola, Kempele (FI); Kari Juhani Hooli, Oulu (FI); Kari Pekka Pajukoski, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 112 days.

(21) Appl. No.: 14/390,575

(22) PCT Filed: Apr. 5, 2012

(86) PCT No.: PCT/EP2012/056255
§ 371 (c)(1),
(2), (4) Date: Oct. 3, 2014

(87) PCT Pub. No.: WO2013/149664
PCT Pub. Date: Oct. 10, 2013

(65) Prior Publication Data
US 2015/0055583 A1 Feb. 26, 2015

(51) Int. Cl.
H04W 72/04 (2009.01)
H04L 5/00 (2006.01)

(52) U.S. Cl.
CPC .......... H04W 72/042 (2013.01); H04L 5/005 (2013.01); H04L 5/0051 (2013.01)

(58) Field of Classification Search
None
See application file for complete search history.

(56) References Cited

U.S. PATENT DOCUMENTS

| 8,831,042 B2* | 9/2014 | Kim | H04B 1/69 370/344 |
|---|---|---|---|
| 2007/0133458 A1 | 6/2007 | Chandra et al. | 370/329 |
| 2009/0109908 A1* | 4/2009 | Bertrand | H04L 5/0051 370/329 |
| 2010/0041350 A1* | 2/2010 | Zhang | H04B 7/068 455/101 |
| 2010/0080154 A1* | 4/2010 | Noh | H04B 7/0452 370/310 |
| 2010/0246561 A1* | 9/2010 | Shin | H04W 52/32 370/345 |
| 2010/0272048 A1* | 10/2010 | Pan | H04L 1/1635 370/329 |
| 2011/0128909 A1* | 6/2011 | Luo | H04L 5/0023 370/328 |
| 2011/0170497 A1 | 7/2011 | Lin et al. | 370/329 |

(Continued)

OTHER PUBLICATIONS

3GPP TSG RAN WG1 #51 R1-074678 Jeju, Korea, Nov. 5-9, 2007; Texas Instruments, Uplink Reference Signals in Support of High-Speed UEs, (6 pages).

(Continued)

Primary Examiner — Duc T Duong
(74) Attorney, Agent, or Firm — Harrington & Smith

(57) ABSTRACT

A method is provided. Amount information is determined. The amount information relates to an amount of reference information a user equipment is to provide. The amount information is caused to be provided to the user equipment. Reference information from the user equipment is used to process data from said user equipment.

19 Claims, 3 Drawing Sheets

(56) References Cited

U.S. PATENT DOCUMENTS

| | | | | |
|---|---|---|---|---|
| 2011/0228722 A1* | 9/2011 | Noh | ................. | H04L 27/2605 |
| | | | | 370/315 |
| 2013/0010836 A1* | 1/2013 | Sartori | ............... | H04L 25/0226 |
| | | | | 375/146 |
| 2014/0376484 A1* | 12/2014 | Park | .................. | H04L 27/2613 |
| | | | | 370/329 |
| 2015/0304014 A1* | 10/2015 | Sadeghi | ............... | H04J 13/004 |
| | | | | 370/315 |
| 2017/0134133 A1* | 5/2017 | Noh | ................... | H04L 5/0051 |
| 2017/0181141 A1* | 6/2017 | Noh | .................. | H04W 72/042 |

OTHER PUBLICATIONS

3GPP TSG RAN WG1 Meeting #66 R1-112481 Athens, Greece Aug. 22-26, 2011; LG Electronics; Consideration on UL DM RS for High-speed UEs in LTE-A, (4 pages).

3GPP TSG RAN WG1 #52bis, Shenzhen, China, Mar. 31-Apr. 4, 2008, R1-081366, "Views on SRS Parameters", Texas. Instruments, 4 pgs.

3GPP TSG RAN WG1 #60bis, Beijing, China, Apr. 12-16, 2010, R1-102215, "Resource Allocation for Dynamie SRS Activation and SRS Multiplexing", Samsung, 3 pgs.

3GPP TSG RAN WG1 Meeting #62, Madrid, Spain, Aug. 23-27, 2010, R1-104331, "Consideration on signaling of UL MIMO", CATT, 4 pgs.

* cited by examiner

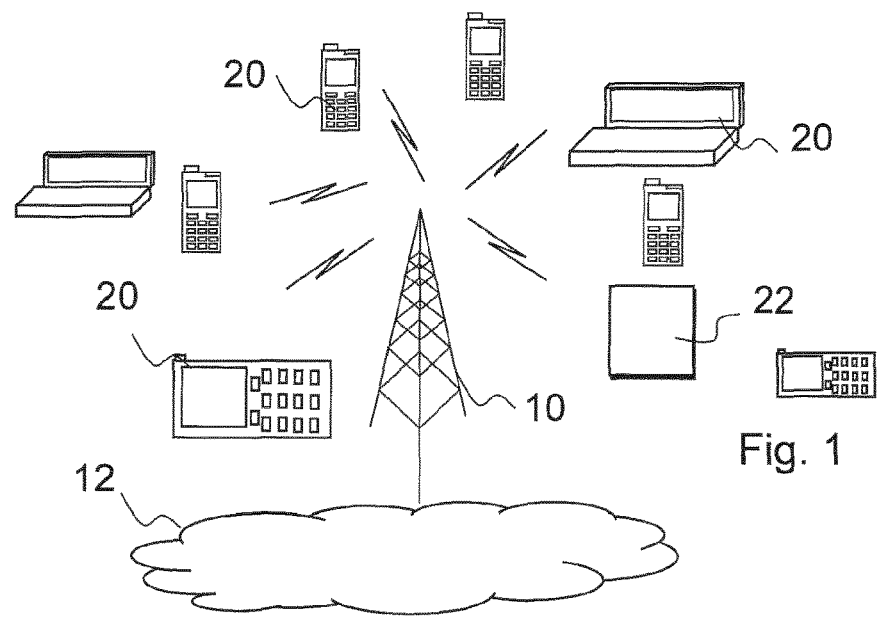
Fig. 1
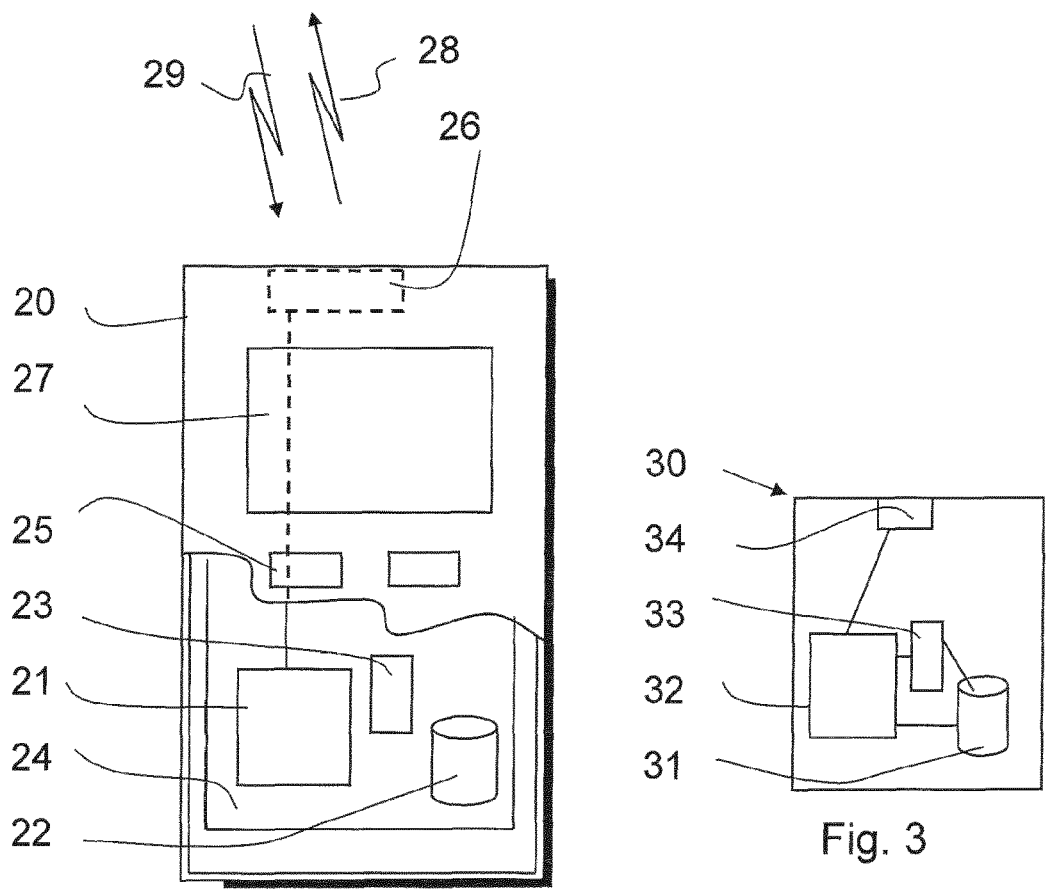
Fig. 2
Fig. 3

METHOD AND APPARATUS FOR SIGNALING REFERENCE SIGNALS TO A UE IN AN LTE SYSTEM

TECHNICAL FIELD

This disclosure relates to a method and apparatus and in particular but not exclusively to methods and apparatus usable in a system which makes use of reference information.

BACKGROUND

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

Users can access the communication system by means of appropriate communication devices. A communication device of a user is often referred to as user equipment (UE) or terminal. A communication device is provided with an appropriate signal receiving and transmitting arrangement for enabling communications with other parties. Typically a device such as user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or other user equipment. The two directions of communications between a base station and communication devices of users have been conventionally referred to as downlink and uplink. Downlink (DL) can be understood as the direction from the base station and uplink (UL) the direction to the base station.

Various control information may need to be signalled between the parties. Control information is typically communicated on control channels, for example on physical uplink control channel (PUCCH) or physical downlink control channel (PDCCH). Furthermore, a large portion of the control signalling may be conveyed via PDSCH/PUSCH (physical downlink shared channel/physical uplink shared channel) as part of higher layer signalling.

SUMMARY

According to an aspect, there is provided a method comprising: determining amount information relating to an amount of reference information a user equipment is to provide; causing said amount information to be provided to said user equipment; and using reference information from said user equipment to process data from said user equipment.

The amount information may comprise a frequency for which said reference information is to be provided.

The amount information may indicate on which slots and/or symbols said reference information is to be transmitted.

The symbols may comprise SC-FDMA symbols.

The amount information may indicate which subframes said reference information is to be transmitted.

The amount information may comprise information identifying one of a plurality of available options.

The amount information may comprise link adaptation information.

The link adaptation information may comprise at least one of coding and modulation information, transport block size and transmission rank.

The method may comprise using said reference information to demodulate said data.

The reference information may comprise at least one of demodulation reference signals and sounding reference signals.

The causing may comprise causing said information to be sent to user equipment via a downlink channel.

The amount information provided to the user equipment may comprise at least one of dynamic and semi-static information.

The method may comprise using previous reference information to process current data from said user equipment.

The method may comprise determining amount information relating to an amount of reference information a user equipment is to provide on an uplink channel and using said reference information from said user equipment to process data on said uplink channel from said user equipment.

This method may be performed in a base station.

According to another aspect, there is provided a base station which is configured to perform the previous method(s).

According to another aspect, there is provided a method comprising: receiving information from which an amount of reference information a user equipment is to provide is obtained; and causing reference information to be provided to a base station in accordance with said received information.

The method may comprise causing data to be provided to a base station, an amount of said data being dependent on said amount of reference information.

The received information may comprise link adaptation information from which said amount of reference information is determined.

The link adaptation information may comprises at least one of coding and modulation information, transport block size and transmission rank.

The above discussed method(s) may be performed by a user equipment.

According to another embodiment, there is provided a user equipment configured to perform one or more of the above method steps.

According to another aspect, there is provided an apparatus comprising: determining means for determining amount information relating to an amount of reference information a user equipment is to provide; causing means for causing said amount information to be provided to said user equipment; and means for using reference information from said user equipment to process data from said user equipment.

The amount information may comprise a frequency for which said reference information is to be provided.

The amount information may indicate on which slots and/or symbols said reference information is to be transmitted.

The symbols may comprise SC-FDMA symbols.

The amount information may indicate which subframes said reference information is to be transmitted.

The amount information may comprise information identifying one of a plurality of available options.

The using means may be for using said reference information to demodulate said data.

The reference information may comprise at least one of demodulation reference signals and sounding reference signals.

The causing means may be for causing said information to be sent to user equipment via a downlink channel.

The amount information provided to said user equipment may comprise at least one of dynamic and semi-static information.

The using means may be for using previous reference information to process current data from said user equipment.

The determining means may be for determining amount information relating to an amount of reference information a user equipment is to provide on an uplink channel and the using means may be for using said reference information from said user equipment to process data on said uplink channel from said user equipment.

According to another aspect, there is provided an apparatus comprising at least one processor and at least one memory including computer code for one or more programs, the at least one memory and the computer code configured, with the at least one processor, to cause the apparatus at least to: determine amount information relating to an amount of reference information a user equipment is to provide; cause said amount information to be provided to said user equipment; and use reference information from said user equipment to process data from said user equipment.

The amount information may comprise a frequency for which said reference information is to be provided.

The amount information may indicate on which slots and/or symbols said reference information is to be transmitted.

The symbols may comprise SC-FDMA symbols.

The amount information may indicate which subframes said reference information is to be transmitted.

The amount information may comprise information identifying one of a plurality of available options.

The at least one memory and the computer code may be configured, with the at least one processor, to cause the apparatus to use said reference information to demodulate said data.

The reference information may comprise at least one of demodulation reference signals and sounding reference signals.

The at least one memory and the computer code may be configured, with the at least one processor, to cause the apparatus to cause said information to be sent to user equipment via a downlink channel.

The amount information provided to the user equipment may comprise at least one of dynamic and semi-static information.

The at least one memory and the computer code may be configured, with the at least one processor, to cause the apparatus to use previous reference information to process current data from said user equipment.

The at least one memory and the computer code may be configured, with the at least one processor, to cause the apparatus to determine amount information relating to an amount of reference information a user equipment is to provide on an uplink channel and use said reference information from said user equipment to process data on said uplink channel from said user equipment.

A base station or a controller of a base station may comprise an apparatus as described above.

According to another aspect, there is provided an apparatus comprising: receiving means for receiving information from which an amount of reference information a user equipment is to provide is obtained; and causing means for causing reference information to be provided to a base station in accordance with said received information.

The means for causing is for causing data to be provided to a base station, an amount of said data being dependent on said amount of reference information.

The received information may comprise link adaptation information from which said amount information is determined.

The link adaptation information may comprise at least one of coding and modulation information, transport block size and transmission rank.

According to another aspect, there is provided an apparatus comprising at least one processor and at least one memory including computer code for one or more programs, the at least one memory and the computer code configured, with the at least one processor, to cause the apparatus at least to: receive information from which an amount of reference information a user equipment is to provide is obtained; and cause reference information to be provided to a base station in accordance with said received information.

The at least one memory and the computer code may be configured, with the at least one processor, to cause the apparatus to cause data to be provided to a base station, an amount of said data being dependent on said amount of reference information.

The received information may comprise link adaptation information from which said amount information is determined.

The link adaptation information may comprise at least one of coding and modulation information, transport block size and transmission rank.

A computer program comprising program code means adapted to perform the method may also be provided. The computer program may be stored and/or otherwise embodied by means of a carrier medium.

It should be appreciated that any feature of any aspect may be combined with any other feature of any other aspect.

BRIEF DESCRIPTION OF THE DRAWINGS

Embodiments will now be described in further detail, by way of example only, with reference to the following examples and accompanying drawings, in which:

FIG. 1 shows a schematic diagram of a communication system comprising a base station and a plurality of communication devices;

FIG. 2 shows a schematic diagram of a mobile communication device according to some embodiments;

FIG. 3 shows a schematic diagram of a control apparatus according to some embodiments;

DETAILED DESCRIPTION

Figure 4:
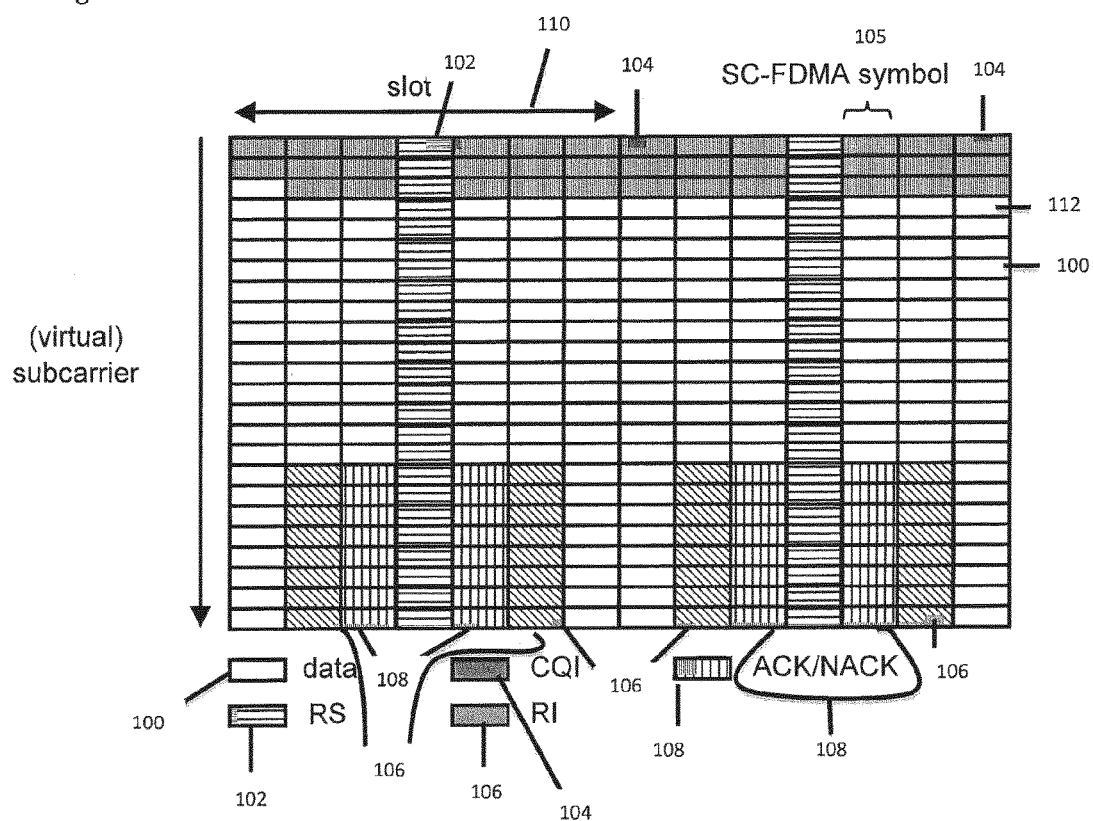
FIG. 4 shows allocation of data and control fields on a PUSCH (physical uplink shared channel)

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access systems include those provided by base stations of systems that are based on technologies such as wireless local area network (WLAN) and/or WiMax (Worldwide Interoperability for Microwave Access).

A device capable of wireless communications can communicate via at least one base station or similar wireless transmitter and/or receiver node. In FIG. 1 a base station 10 is shown to be serving various mobile devices 20 and a machine-like terminal 22. Base stations are typically controlled by at least one appropriate controller apparatus so as to enable operation thereof and management of mobile communication devices in communication with the base stations. The base station can be connected further to a broader communications system 12. It shall be understood that a number of neighbouring and/or overlapping access systems or radio service areas provided by a number of base stations may exist. A base station site can provide one or more cells or sectors, each sector providing a cell or a subarea of a cell.

A possible mobile communication device for transmitting in uplink and receiving in downlink will now be described in more detail with reference to FIG. 2 showing a schematic, partially sectioned view of a communication device 20. Such a communication device is often referred to as user equipment (UE) or terminal. An appropriate communication device may be provided by any device capable of sending radio signals to and/or receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of content data include downloads, television and radio programs, videos, advertisements, various alerts and other information.

The device 20 is configured to receive signals in the downlink 29 over an air interface via appropriate apparatus for receiving and to transmit signals in the uplink 28 via appropriate apparatus for transmitting radio signals. In FIG. 2 the transceiver apparatus is designated schematically by block 26. The transceiver apparatus 26 may be provided for example by means of a radio part and associated antenna arrangement. The antenna arrangement may be arranged internally or externally to the mobile device.

A mobile communication device is also provided with at least one data processing entity 21, at least one memory 22 and other possible components 23 for use in software and hardware aided execution of tasks it is designed to perform, including control of access to and communications with base stations and/or other communication devices. The data processing, storage and other relevant apparatus can be provided on an appropriate circuit board and/or in chipsets. This apparatus is denoted by reference 24.

The user may control the operation of the mobile device by means of a suitable user interface such as key pad 25, voice commands, touch sensitive screen or pad, combinations thereof or the like. A display 27, a speaker and a microphone can be also provided. Furthermore, a communication device may comprise appropriate connectors (either wired or wireless) to other devices and/or for connecting external accessories, for example hands-free equipment, thereto.

FIG. 3 shows an example of a control apparatus 30 for a communication system, for example to be coupled to and/or for controlling a base station. In some embodiments a base station may comprise an integrated control apparatus and some other embodiments the control apparatus can be provided by a separate network element. The control apparatus can be interconnected with other control entities. The control apparatus and functions may be distributed between a plurality of control units. In some embodiments each base station can comprise a control apparatus. In alternative embodiments, two or more base stations may share a control apparatus.

The arrangement of the control may depend on the standard, and for example in accordance with the current LTE specifications no separate radio network controller is provided. Regardless of the location, the control apparatus 30 can be understood as providing control on communications in the service area of at least one base station. The control apparatus 30 can be configured to provide control functions in association with scheduling of uplink in accordance with embodiments described below. For this purpose the control apparatus can comprise at least one memory 31, at least one data processing unit 32, 33 and an input/output interface 34. Via the interface the control apparatus can be coupled to a base station to cause operation of the base station in accordance with the below described embodiments. The control apparatus can be configured to execute an appropriate software code to provide the control functions.

A wireless communication device, such as a mobile device, machine-like terminal or a base station, can be provided with a Multiple Input/Multiple Output (MIMO) antenna system. MIMO arrangements as such are known. MIMO systems use multiple antennas at the transmitter and receiver along with advanced digital signal processing to improve link quality and capacity. For example, the transceiver apparatus 26 of FIG. 2 can provide a plurality of antenna ports. More data can be received and/or sent where there are more antennae elements.

It has been proposed to respond to the need for ever increasing network capacity to provide small cell sizes and denser network deployments. Local area scenarios may have small cell sizes, low user equipment mobility and/or potentially low interference levels in for example indoor scenarios.

Some embodiments may improve uplink spectral efficiency by optimising the usage of reference signals.

Alternatively or additionally some embodiments may be used for downlink scenarios. To improve uplink spectral efficiency, one option may be to reduce the overhead due to uplink demodulation reference signals (DM RS). This may be to increase spectral efficiency in a local area scenario, where the cells sizes are relatively small and/or in any other suitable scenario.

Reference is made to FIG. 4 which shows one example of mapping of different uplink channels and signals to resources. In particular, FIG. 4 shows the allocation of data in different control fields on the PUSCH with the normal cyclic prefix. One subframe (taking 1 ms) and two physical resource blocks PRB are shown in this figure. The data resource elements are clear and referenced 100. The CQI (channel quality indicator) resource elements are shaded and referenced 104. The acknowledgement/negative acknowledgement (ACK/NACK) resource elements are referenced 108 and are shown with the blocks with the vertical hatching. The rank indicator resources RI are shown with the diagonal hatching and referenced 106. The reference signal resource elements RS are shown with the horizontal hatching and referenced 102.

As can be seen from FIG. 4, the uplink demodulation reference signals 102 reserve 2 out of the 14 SC-FDMA (single carrier-frequency division multiple access) symbols. Each column of FIG. 4 represents a SC-FDMA symbol. This gives the overhead of around 14% with the normal cyclic prefix. With the extended cyclic prefix, this gives an overhead of 2/12 which is around 17%.

In embodiments, system performance, such as data throughput may be improved by reducing the DM RS overhead.

One method of reducing the number of DM RS signals by one SC-FDMA symbol per subframe may be by cell specific configuration. However, in some embodiments, that may reduce cell edge performance. In some embodiments this may limit multi-user multiple input multiple output MU-MIMO operation. However, it should be appreciated that in some embodiments, these disadvantages may not occur.

In some embodiments, configurability may be provided to support DM RS overhead reduction. One or more of the following DM RS options may be supported.

1. DM RS may be transmitted in both slots of a subframe as shown in FIG. 4. It should be appreciated that a subframe may be made up of two slots. Each slot 110 is made up of seven SC-FDMA symbols 105. As mentioned previously, the symbols may contain one or more of data, RS, RI, CQI or ACK/NACK resource elements.
2. DM RS are transmitted only in one of the slots of a subframe. In other words, in the arrangement shown in FIG. 4, the DM RS would only be transmitted in one of the two slots shown.
3. The DM RS are not transmitted in a current subframe. In other words, neither slot of a subframe will have the DM RS.

In embodiments, all three of the above-mentioned DM RS options may be supported and at different times different ones of those options may be used. It should be appreciated that in some embodiments, only one or two of the above described options may be available options.

Some embodiments may alternatively have the option to transmit the DM-RS in both slots but only for, by of example only, half the subcarriers.

Where one or more DM RS is absent in the current subframe, the user equipment may autonomously transmit on the PUSCH data using the resources originally reserved for the DM RS. This may be in addition to the resources normally used for data transmission. In other words, more resources will now be available for the PUSCH data as compared to the arrangement shown in FIG. 4.

Some embodiments may provide a method for switching between these different DM RS options. In one embodiment, the switching can be done dynamically via up link grant messaging. For example, the DM RS structure may depend on the signalled MCS/TBS (modulation and coding scheme/transmit block size). With higher MCS/TBS, the SINR (signal to interference and noise ratio) may be higher. Thus, reliable channel estimation may be achieved with less DM RS overhead. For example, the better the channel, the fewer the number DM RS resources required. Alternatively or additionally any other suitable link adaption information may be considered such as transport block size and/or transmission rank.

Alternatively or additionally, some other field in the uplink grant messaging may be used or reused for this purpose. For example, the CSI (cyclic shift) field or the aperiodic SRS (sounding reference signal) request field may be used. This may allow for more independent and dynamic selection of the DM RS structure.

In some embodiments, the switching may rely on a combination of the two described methods. For example, certain CSI field code points can indicate the reduced DM RS when MCS/TBS exceeds a predefined threshold.

Alternatively or additionally, the switching can be semi-static and based on radio resource control (RRC) signalling.

In some embodiments, to complement the reduced DM RS, modification of the aperiodic SRS operation may be introduced. Aperiodic SRS may be triggered to be transmitted in any subframe regardless of whether that subframe has been configured as a cell specific SRS subframe or not. Alternatively or additionally more flexible symbol allocation for aperiodic SRS may be considered, e.g. first SC-FDMA symbol of the subframe can be applied for the SRS. Alternatively or additionally, the aperiodic SRS may be transmitted using the same bandwidth and frequency position as PUSCH data. If the PUSCH bandwidth and frequency position does not match the bandwidth and frequency position options available for SRS, the closest match may be chosen. Alternatively or additionally, the CS and IFDMA (interleaved frequency division multiple access) comb can be implicitly derived based on the for example the CSI field in the uplink grant, allowing for MU-MIMO operation. In some embodiments, the base station may control the operation to ensure that a user equipment transmits sufficient reference signals for demodulation purposes.

Some examples of ways of operating the system with reduced DM RS are listed below. Some embodiments may operate based on DM RS. Where a user equipment has a relatively large amount of data in its buffer, the base station may schedule multiple consecutive uplink subframes for that data. As the channel coherence time is expected to be relatively long, for example longer than 1 ms which is the duration of the subframe, particularly in local area scenarios, the base station may schedule the same physical resources to the user equipment in multiple subframes. This may be where the base station has an accurate channel knowledge. Thus, the base station may for example utilise the DM RS transmitted in subframe N for the demodulation of data transmitted in other subframes where the index is greater than N. The base station is aware of the channel state so that the base station does not require the user equipment to transmit the DM RS in every slot such as shown in FIG. 4 but for example may be every other slot or subframe or less frequently.

In some embodiments the base station may use the SRS. SRS has previously been proposed for channel sounding to aid for example link adaption and to provide a reference for timing estimation. In some embodiments, the base station may use the SRS for data demodulation. This may reduce the need for the number of DM RS to be transmitted. Periodic and/or aperiodic SRS may be used. Periodic and aperiodic SRS are such that a set of cell specific transmission opportunities are configured. These transmission opportunities are sometimes referred to as SRS subframes. Periodic SRS are transmitted deterministically according to a semi static configuration whilst aperiodic SRS can be dynamically triggered by the base station. Periodic and/or aperiodic SRS may provide sufficient information to carry out PUSCH data demodulation in some situations. The situations may be example where the propagation channel is relatively static and/or of a relatively high quality.

The base station may control the user equipment to ensure that the user equipment transmits SRS often enough so that the data demodulation can be carried out.

An improvement to the A-SRS triggering flexibility may help in using these signals for data demodulation purposes.

When the user equipment selects SRS bandwidth and frequency position option that is the closest possible to PUSCH allocation, it may consider such SRS bandwidth and frequency position options that deviate from the PUSCH allocation. This may be for example too narrow SRS or a misaligned frequency position between the SRS and PUSCH. User equipment may select SRS option such that up to M consecutive PUSCH PRBs in frequency may be provided without a SRS corresponding transmission. Otherwise a SRS option with a wider bandwidth than the PUSCH allocation may be selected.

In some embodiments, the user equipment and/or the base station may need to take the reduced DM RS into account in the transport block size definition, PUSCH rate matching, interleaving and/or UCI (Uplink control information such as ACK/NACK, RI and CQI) dimensioning.

In some embodiments, the usage of reduced DM RS may be limited to the first transmission of the transport block on the PUSCH or to PUSCH transmissions explicitly scheduled with uplink grant. In other words, PHICH (physical HARQ indicated channel) triggered retransmissions may follow the existing multiplexing with two DM RS blocks per subframe. The PHICH resource may be implicitly derived from uplink grant information.

Figure 5:
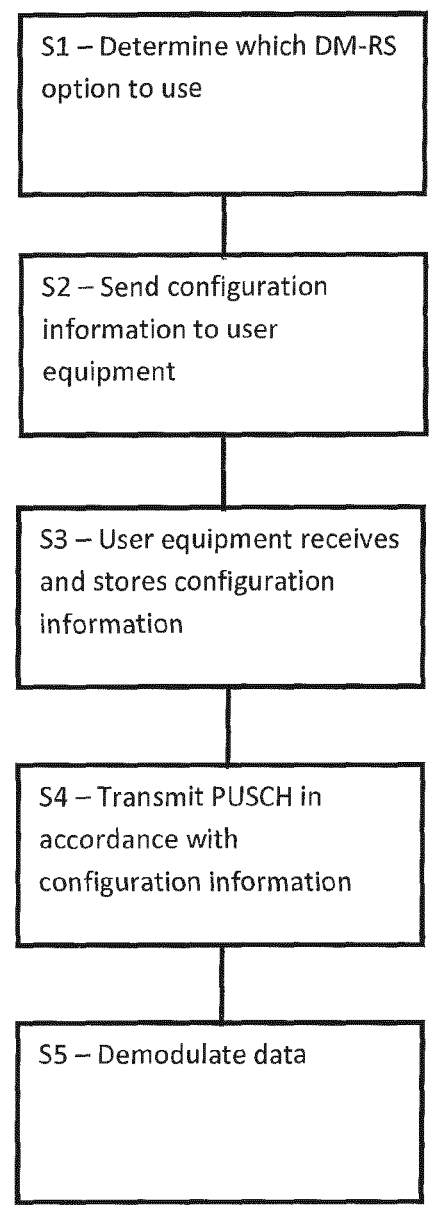
FIG. 5 shows a flowchart according to an embodiment.

Some embodiments may allow the uplink overhead to be reduced. This is because the number of DM RS required may be reduced so that increased peak data rates may be accommodated. In some embodiments, the dynamic configuration of DM RS may allow for backwards compatibility in for example MU-MIMO or intra subframe frequency hopping operations. Reference is now made to FIG. 5 which shows a method.

In step S1, a base station determines which DM RS option to use. This decision may take into account the conditions in the cell and or surrounding cells. These conditions may for example relate to traffic, quality of signals or the like.

The DM RS option may be one of the various options discussed previously.

In step S2, the base station sends the configuration information to the user equipment. This may be sent in a dedicated message and/or in combination with other information which is sent from the base station to the user equipment.

In step S3, the user equipment receives and stores the configuration information.

In step S4, the user equipment will transmit the PUSCH in accordance with the configuration information. In particular, the configuration information will control how many DM RS symbols are transmitted.

In step S5, the base station will demodulate the data on the PUSCH channel. The demodulation may use for example the DM RS and/or SRS information, as previously discussed. This may use current or previous DM RS and/or SRS as previously discussed.

In some embodiments, the determination as to which DM RS option to use may be taken by a control node such as a radio network controller. The configuration which is used may be fixed on a per cell basis Where the DM RS option is configured on a per cell basis, and for example does not change over time, the DM RS option may be provided to the user equipment when the user equipment is handed over to the cell in question.

It is noted that whilst embodiments have been described in relation to LTE, similar principles can be applied to any other communication system or to further developments with LTE. Thus, although the embodiments are described with references to uplink and downlink, these terms should not be understood as limiting as the disclosure is not limited by the directions between a base station and a user terminal. Instead, the invention is applicable to any system where a control apparatus can control transmissions between two or more communicating entities. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a control apparatus for a base station, a controller, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
    determining amount information relating to an amount of reference information comprising demodulation reference symbols a user equipment is to provide, wherein said amount information identifies in which one slot or two slots and symbols of a subframe said reference information is to be provided, wherein the reference information in the one slot or two slots of the subframe is predetermined based on one of uplink grant messaging or a modulation and coding scheme/transmit block size;
    causing said amount information to be provided to said user equipment;
    in response to said amount information, receiving said reference information in said subframe from said user equipment, wherein based on the amount information the reference information is received in the predetermined one slot of the subframe or two slots of the subframe; and
    using said reference information comprising said demodulation reference symbols from said user equipment to process data received over the subframe from said user equipment.

2. The method as claimed in claim 1, wherein said amount information comprises a frequency for which said reference information is to be provided.

3. The method as claimed in claim 1, wherein said reference information comprises sounding reference symbols.

4. The method as claimed in claim 1, wherein said amount information comprises information identifying the one slot or the two slots of the subframe that said reference signal information is provided.

5. The method as claimed in claim 1, wherein said amount information comprises link adaptation information.

6. The method as claimed in claim 5, wherein said link adaptation information comprises at least one of coding and modulation information, transport block size and transmission rank.

7. The method as claimed in claim 1, wherein if the reference information is received in two slots of the subframe, the reference information using, based on the amount information, only a predefined portion of subcarriers available in each of the two slots.

8. The method as claimed in claim 1, wherein said reference information comprises sounding reference signals.

9. The method as claimed in claim 1, wherein said causing comprises causing said information to be sent to user equipment via a downlink channel.

10. The method as claimed in claim 1, wherein said amount information provided to said user equipment comprises at least one of dynamic and semi-static information.

11. The method as claimed in claim 1, comprising using previous reference information to process the data from said user equipment.

12. The method as claimed in claim 1 comprising determining amount information relating to an amount of reference information a user equipment is to provide on an uplink channel and using said reference information from said user equipment to process data on said uplink channel from said user equipment.

13. A non-transitory memory embodying a computer program comprising computer executable instructions the computer executable instructions executed by a processor to perform the method of claim 1.

14. A method comprising:
    receiving information indicating an amount of reference information comprising demodulation reference symbols a user equipment is to provide, wherein said amount of reference information identifies in which one slot or two slots and symbols of a subframe said reference information is to be provided, wherein the reference information in the one slot or two slots of the subframe is predetermined based on one of uplink grant messaging or a modulation and coding scheme/transmit block size; and
    causing reference information comprising said demodulation reference symbols to be provided to a base station in said one slot or two slots of the subframe in accordance with said received information, wherein based on the received information the reference information is provided in the predetermined one slot of the subframe or two slots of the subframe, and wherein said reference information is for use to process data received over the subframe from said user equipment.

15. The method as claimed in claim 14, comprising causing data to be provided to the base station, an amount of said data being dependent on said amount of reference information.

16. The method as claimed in claim 14, wherein said received information comprises link adaptation information from which said amount of reference information is determined.

17. The method as claimed in claim 16, wherein said link adaptation information comprises at least one of coding and modulation information, transport block size and transmission rank.

18. An apparatus comprising:

at least one processor and at least one memory including computer code for one or more programs, the at least one memory and the computer code configured, with the at least one processor, to cause the apparatus at least to:

determine amount information relating to an amount of reference information comprising demodulation reference signals a user equipment is to provide, wherein said amount information identifies in which one slot or two slots and symbols of a subframe said reference information is to be provided, wherein the reference information in the one slot or two slots of the subframe is predetermined based on one of uplink grant messaging or a modulation and coding scheme/transmit block size;

cause said amount information to be provided to said user equipment;

in response to said amount information, receiving said reference information in said subframe from said user equipment, wherein based on the amount information the reference information is received in the predetermined one slot of the subframe or two slots of the subframe; and use said reference information comprising said demodulation reference symbols from said user equipment to process data received over the subframe from said user equipment.

19. An apparatus comprising:

at least one processor and at least one memory including computer code for one or more programs, the at least one memory and the computer code configured, with the at least one processor, to cause the apparatus at least to:

receive information indicating an amount of reference information comprising demodulation reference symbols a user equipment is to provide, wherein said amount of reference information identifies in which one slot or two slots and symbols of a subframe said reference information is to be provided, wherein the reference information in the one slot or two slots of the subframe is predetermined based on one of uplink grant messaging or a modulation and coding scheme/transmit block size; and cause reference information comprising said demodulation reference symbols to be provided to a base station in said at least one of slots and symbols of the subframe in accordance with said received information, wherein based on the received information the reference information is provided in the predetermined one slot of the subframe or two slots of the subframe, and wherein said reference information is for use to process data received over the subframe from said user equipment.

* * * * *